J. MURGAS.
CASTING REEL.
APPLICATION FILED DEC. 21, 1911.
1,024,739.
Patented Apr. 30, 1912.
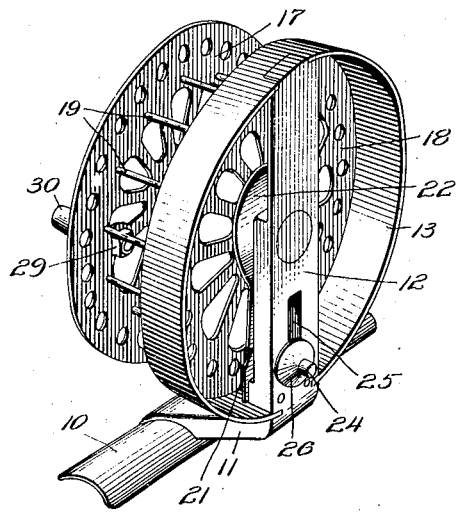
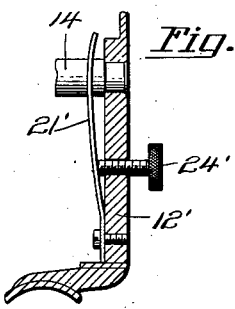
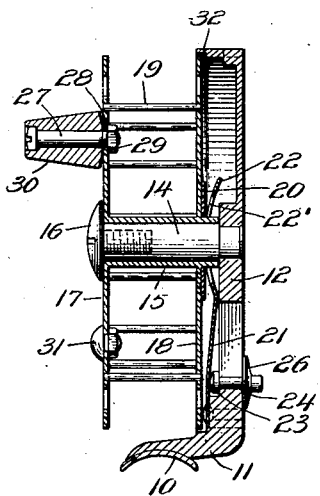
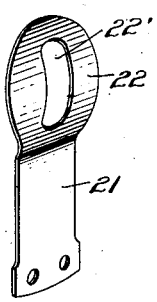
Witnesses
F. C. Gibson.
B. M. Kent
Inventor
Joseph Murgas
by Foster Freeman Watson Hort
Attorneys

UNITED STATES PATENT OFFICE.

JOSEPH MURGAS, OF WILKES-BARRE, PENNSYLVANIA.

CASTING-REEL.

1,024,739.  Specification of Letters Patent.  Patented Apr. 30, 1912.

Application filed December 21, 1911. Serial No. 667,128.

*To all whom it may concern:*

Be it known that I, JOSEPH MURGAS, a citizen of the United States, residing at Wilkes-Barre, county of Luzerne, State of Pennsylvania, have invented certain new and useful Improvements in Casting-Reels, of which the following is a specification.

This invention relates to fishing reels and more particularly to the type of reel used for casting.

The object of the invention is to provide effective means for retarding the spool as the line unwinds and to provide a novel handle from which the line will readily slip off when it becomes accidentally looped around the handle.

The novel features of the invention will be apparent from the following description taken in connection with the drawings, in which:

Figure 1 is a perspective view of a reel embodying my invention. Fig. 2 is a central transverse section through Fig. 1. Fig. 3 is a perspective view of the retarding device. Fig. 4 is a transverse section similar to Fig. 2 of a part of the reel and showing a modified form of the invention.

Referring to the drawings 10 indicates a support which is adapted to be secured to the fishing rod. This support is provided with a central offset portion 11 from which projects the arm 12. A circular casing 13 is secured to the arm 12, as indicated in the drawings, the arm being diametrically arranged with respect to the casing. A stud 14 is secured to the arm 12 at a point corresponding to the center of the casing. A spool 15 is rotatably mounted on the stud 14 and a screw 16 secured to the outer end of the stud 14 holds the spool in position. The spool 15 may be of any suitable construction, but preferably comprises the sides 17 and 18 connected together by the cross rods 19, the latter being arranged to form a support for the line. The side of the spool adjacent the arm 12 is provided with a suitable wearing ring 20. A spring 21 is secured to the arm 12 on the inner side thereof near the periphery of the spool and extends in a radial direction and is provided at its free end with a curved portion 22 convexly arranged with respect to the spool and provided with a slot 22' through which extends the stud 14, the portion 22 being arranged to bear against the ring 20. The spring 21 has its intermediate portion inclined with respect to the arm 12, as clearly indicated in Fig. 2, and this portion of the spring is engaged by a head 23 on the pin 24 which is slidably mounted in the slot 25 in the arm 12, the pin being held in the slot by means of the washer 26 or any other suitable means. From Fig. 2 it will be observed that as the pin 24 is moved toward the stud 14 the head 23 will force the spring 21 toward the spool and thereby increase the pressure of the curved portion 22 of the spring against the ring 20, this pressure being gradually relieved as the pin 24 is moved in the opposite direction. The pin 24 will be held in any desired position in the slot 25 by the friction thereof with the sides of the slot and also with the spring 21. A suitable bolt 27 is secured to the side 17 of the spool by means of the screw threads 28 and a nut 29 or in any other suitable manner, and has rotatably mounted thereon the frusto-conical handle 30, this handle being arranged with its largest diameter next to the side 17, whereby the line tends to slip off from the handle whenever it comes into engagement therewith. A suitable counterbalance 31 is secured to the side 17 diametrically opposite the handle 30. In order to prevent the line from getting between the side 18 of the spool and the casing 13 it will be observed from Fig. 2 that the side 18 is arranged within the margin of the casing, a groove 32 being provided in the casing to accommodate the side of the spool.

In Fig. 4 I have shown a modification in which a spring 21' is secured to the arm 12' and is provided with a suitable slot through which extends the stud 14, this construction being substantially the same as in the modification above described. In place of the slot 25 and the sliding pin 24 shown in Fig. 2 I provide a screw 24' which has threaded engagement with the arm 12' as clearly indicated. By this construction the pressure of the spring against the hub of the spool may be varied by means of the screw 24'.

Having thus described the invention what I claim as new and desire to secure by Letters Patent is:

1. A device of the class described comprising a support provided with a spool stud, a circular casing fixed on said support, a spool arranged on said stud and having one flange within said casing, a spring member having one end secured to the support and its opposite end arranged to bear against the hub of the spool, and means, carried by said support and bearing against said spring member, adapted to vary the pressure of the spring member on the spool.

2. In a device of the class described, the combination of a support provided with a spool stud, a circular casing fixed on said support, a spool arranged on said stud and having one flange within said casing, a spring member having one end secured to said support and its other end surrounding said stud and arranged to bear against the hub of the spool, and a slide, carried by said support and engaging said spring, adapted to move radially with respect to said stud, to vary the pressure of the spring member on the spool.

3. In a device of the class described, the combination of a support having a laterally projecting arm thereon, a circular casing carried by said arm, the arm being diametrically disposed with respect to the casing, a stud projecting laterally from said arm at the center of the casing, a spool rotatably mounted on the stud and having one flange within the casing, means for holding the spool on the stud, a spring having one end fixed to said arm and arranged between the arm and the spool and adapted to engage the hub of the spool, a longitudinal slot in said arm, and a member, slidably mounted in said slot and engaging said spring, adapted to vary the pressure of said spring against the spool.

4. In a device of the class described, the combination of a support having a laterally projecting arm thereon, a circular casing carried by said arm, the arm being diametrically disposed with respect to the casing, a stud projecting laterally from said arm at the center of the casing, a spool rotatably mounted on the stud and having one flange within the casing, means for holding the spool on the stud, a spring having one end fixed to said arm near the casing and having its free end convexly formed with respect to the spool and surrounding the stud and bearing against the spool, the intermediate portion of the spring being inclined with respect to the arm, a longitudinal slot in said arm, and a member, slidably mounted in said slot and engaging the inclined portion of the spring adapted to increase the pressure of the spring against the spool when moved toward said stud.

5. In a device of the class described, the combination of a support provided with a spool stud, a spool arranged on said stud, a spring member having one end secured to said support and its other end bearing against the hub of the spool, and a member, slidably mounted on said support and engaging said spring, adapted to vary the pressure of the spring on the hub when moved.

In testimony whereof I affix my signature in presence of two witnesses.

JOSEPH MURGAS.

Witnesses:
EDWARD J. KELLY,
MARGARET GALLENA.